United States Patent
Ueda et al.

(10) Patent No.: US 10,981,597 B2
(45) Date of Patent: Apr. 20, 2021

(54) VEHICLE CONTROL DEVICE AND METHOD

(71) Applicant: HONDA MOTOR CO., LTD., Tokyo (JP)

(72) Inventors: Yugo Ueda, Wako (JP); Maiko Adachi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 98 days.

(21) Appl. No.: 16/469,795

(22) PCT Filed: Dec. 16, 2016

(86) PCT No.: PCT/JP2016/087491
§ 371 (c)(1),
(2) Date: Jun. 14, 2019

(87) PCT Pub. No.: WO2018/109918
PCT Pub. Date: Jun. 21, 2018

(65) Prior Publication Data
US 2019/0382049 A1    Dec. 19, 2019

(51) Int. Cl.
*B60W 30/08* (2012.01)
*G06T 7/60* (2017.01)
(Continued)

(52) U.S. Cl.
CPC ............... *B62D 6/00* (2013.01); *B60T 8/17* (2013.01); *B60W 30/08* (2013.01); *B60W 30/12* (2013.01);
(Continued)

(58) Field of Classification Search
CPC ........... G06K 9/00791; G06K 9/00798; G06K 9/00805; G06T 7/536; G06T 7/60;
(Continued)

(56) References Cited

U.S. PATENT DOCUMENTS

2015/0348416 A1    12/2015   Fujita et al.
2017/0101056 A1*    4/2017   Park ..................... B60R 1/00

FOREIGN PATENT DOCUMENTS

JP    S51-084028 U    7/1976
JP    2001-023094 A   1/2001
(Continued)

OTHER PUBLICATIONS

Office Action dated Feb. 12, 2020 issued over the corresponding Japanese national phase Patent Application No. 2018-556137 of the same international Patent Application as the present case with the English translation thereof.
(Continued)

*Primary Examiner* — Andrew W Johns
(74) *Attorney, Agent, or Firm* — Carrier Blackman & Associates, P.C.; Joseph P. Carrier; Jeffrey T. Gedeon

(57) ABSTRACT

The purpose of the present invention is to perform mirror control as driving control when recognizing a mirror in front of the vehicle. By adopting this configuration, it is possible to perform appropriate driving control for automated driving. Another purpose of the present invention is to perform mirror processing as recognition processing when recognizing a mirror in front of a vehicle. By adopting this configuration it is possible to perform appropriate recognition processing in automated driving.

7 Claims, 7 Drawing Sheets

(51) Int. Cl.
 *G08G 1/16* (2006.01)
 *B62D 6/00* (2006.01)
 *B60T 8/17* (2006.01)
 *B60W 30/12* (2020.01)
 *B60W 40/04* (2006.01)

(52) U.S. Cl.
 CPC ............... *B60W 40/04* (2013.01); *G06T 7/60* (2013.01); *G08G 1/166* (2013.01); *G08G 1/167* (2013.01)

(58) Field of Classification Search
 CPC ............. G06T 7/68; G06T 2207/30252; G06T 2207/30256; G06T 2207/30261; G08G 1/166; G08G 1/167; B60W 30/08; B60W 30/10; B60W 30/12; B60W 40/04
 See application file for complete search history.

(56) References Cited

FOREIGN PATENT DOCUMENTS

| | | |
|---|---|---|
| JP | 2007-279805 A | 10/2007 |
| JP | 2012-185669 A | 9/2012 |
| JP | 2014-191485 A | 10/2014 |
| WO | 2014/083825 A1 | 6/2014 |

OTHER PUBLICATIONS

International Search Report (PCT/ISA/210) from International Application PCT/JP2016/087491 and the English translation thereof.

\* cited by examiner

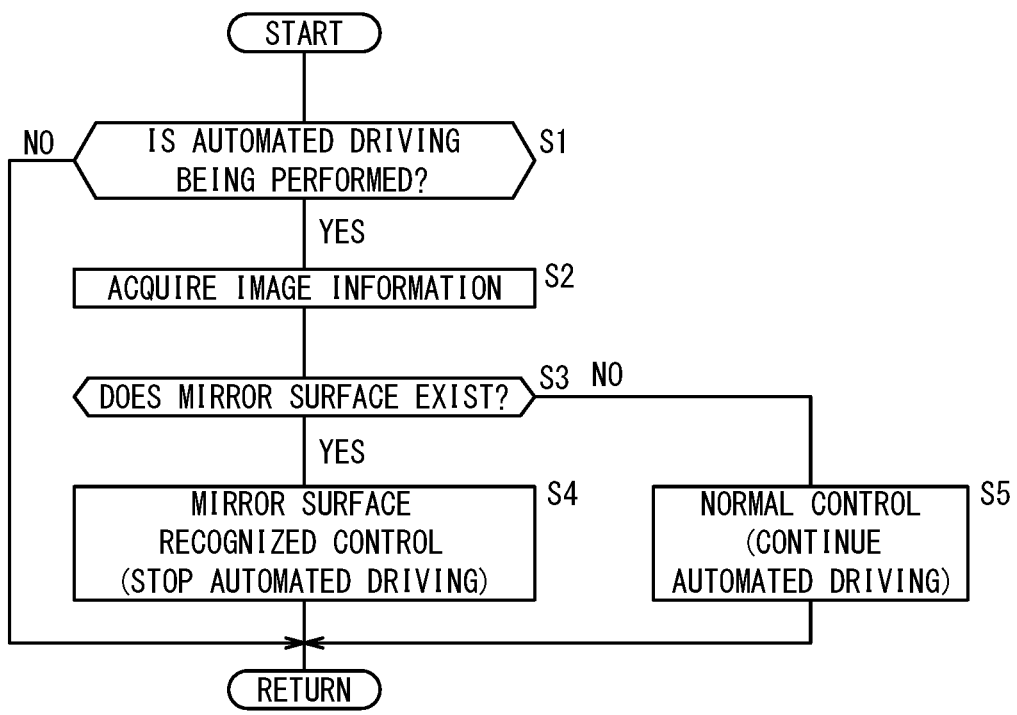

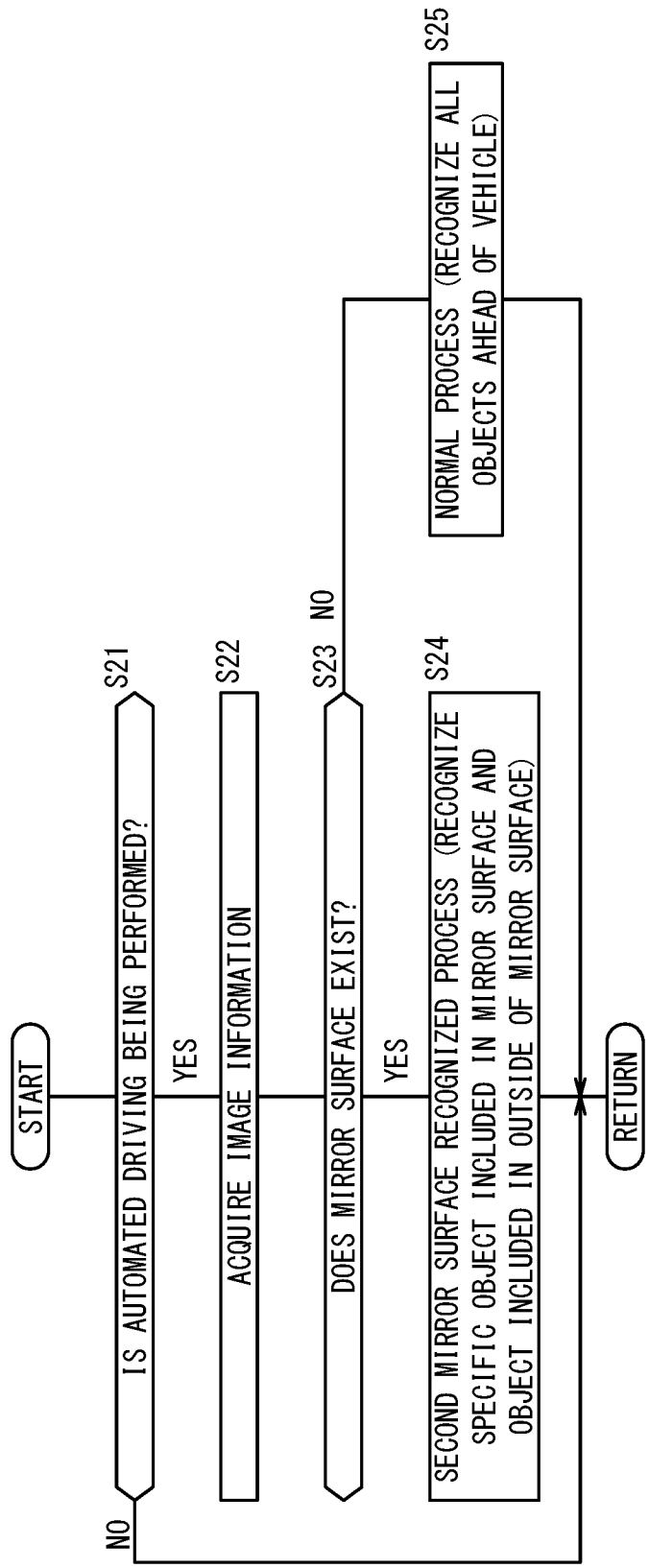

VEHICLE CONTROL DEVICE AND METHOD

TECHNICAL FIELD

The present invention relates to a vehicle control device and a method that perform a process of recognizing a front view of a vehicle on the basis of image information that is photographed by a camera, and perform travel control of automated driving on the basis of a recognition result.

BACKGROUND ART

An automated driving vehicle (hereinafter, also referred to as "vehicle") performs vehicle control while recognizing an external environment ahead of the vehicle (a traffic participant, an obstacle, a road structure, a lane mark, a traffic signal, a sign, or the like) on the basis of image information photographed by a camera. Incidentally, when the vehicle travels on public roads, there is a circumstance where the vehicle travels behind a preceding vehicle including a mirror surface (that is to say, a panel, a head, an end plate, or an end cover) on its rear surface, such as a tank lorry (a tanker). The mirror surface of the tank lorry reflects the external environment behind the vehicle. That is to say, the image information acquired by photographing the mirror surface of the tank lorry by the camera does not correspond to external environment information ahead of the vehicle but corresponds to the external environment information behind the vehicle. Thus, a device (ECU, etc.) that performs vehicle control by the automated driving needs to distinguish pieces of the image information inside and outside the mirror surface before performing the vehicle control.

Japanese Laid-Open Patent Publication No. 2014-191485 discloses an obstacle detection device mounted on a small electric vehicle such as an electric wheelchair or a mobility scooter. In a paragraph [0051] of Japanese Laid-Open Patent Publication No. 2014-191485, in a case where the amount of light (reflection light) reflected on the mirror surface such as a floor surface or metal is large, wrong determination based on the image information easily occurs; therefore, a driver is warned.

SUMMARY OF INVENTION

If the technique described in Japanese Laid-Open Patent Publication No. 2014-191485 is used for the automated driving vehicle, the driver is warned at the time of detection of the mirror surface. However, a process or control regarding the automated driving does not change at all.

The present invention has been made in view of the above problem, and an object is to provide vehicle control device and method that appropriately operate an automated driving vehicle in a case where a mirror surface exists ahead of the vehicle.

A first aspect of the invention is a vehicle control device provided for a vehicle that is configured to travel by automated driving in which at least a part of vehicle travel is not performed by a driver, and the vehicle control device includes: a camera configured to photograph a front view of the vehicle; and a control unit configured to perform a recognition process for the front view of the vehicle on a basis of image information photographed by the camera, and perform travel control of the automated driving on a basis of a recognition result, wherein: if a mirror surface is not recognized ahead of the vehicle, the control unit is configured to perform a normal process as the recognition process or perform normal control as the travel control; and if the mirror surface is recognized ahead of the vehicle, the control unit is configured to perform a mirror surface recognized process that is different from the normal process as the recognition process, or perform mirror surface recognized control that is different from the normal control as the travel control.

As described in the above configuration, in the case where the mirror surface is recognized ahead of the vehicle, if the mirror surface recognized process is performed as the recognition process, the recognition process regarding the automated driving can be performed appropriately. In addition, as described in the above configuration, in the case where the mirror surface is recognized ahead of the vehicle, if the mirror surface recognized control is performed as the travel control, the travel control regarding the automated driving can be performed appropriately.

If one vanishing point is recognized ahead of the vehicle on a basis of the image information, the control unit is configured to recognize a state where the mirror surface does not exist ahead of the vehicle, and if a plurality of vanishing points are recognized ahead of the vehicle, the control unit is configured to recognize a state where the mirror surface exists ahead of the vehicle. In the above configuration, by a simple method, it can be determined whether the mirror surface exists ahead of the vehicle.

The control unit is configured to perform the travel control of the automated driving as the normal control, and stop the travel control of the automated driving as the mirror surface recognized control. By the above configuration, if the mirror surface exists ahead of the vehicle, the driving can be taken over from the vehicle to the driver.

The control unit is configured to, as the normal process, regard an object ahead of the vehicle as a recognition target, and, as the mirror surface recognized process, regard an object outside the mirror surface ahead of the vehicle as the recognition target. By the above configuration, if the mirror surface exists ahead of the vehicle, an object included in the mirror surface, that is, external environment information behind the vehicle can be ignored, and only the object outside the mirror surface, that is, only the external environment information ahead of the vehicle can be regarded as the recognition target.

The control unit is configured to, as the normal process, regard an object ahead of the vehicle as a recognition target, and, as the mirror surface recognized process, regard an object outside the mirror surface as the recognition target and a specific object included in the mirror surface as the recognition target. By the above configuration, if the mirror surface exists ahead of the vehicle, useful information of the object included in the mirror surface, that is, the external environment information behind the vehicle can be used.

The control unit is configured to regard an image of a lane mark included in the mirror surface as the recognition target. By the above configuration, if the mirror surface exists ahead of the vehicle, the vehicle can be controlled by using the image of the lane mark reflected in the mirror surface.

The control unit is configured to regard an image of the vehicle and images of lane marks included in the mirror surface as the recognition target, and perform control of keeping a position of the vehicle between the lane marks on a basis of a recognition result about the images of the lane marks included in the mirror surface and a recognition result about the image of the vehicle included in the mirror surface. By the above configuration, even if the lane mark ahead of the vehicle cannot be recognized, lane keeping control of the vehicle can be performed by using the recognition result about the images of the lane marks and the image of the vehicle acquired from the mirror surface.

A second aspect of the invention is a vehicle control method including photographing a front view of a vehicle that travels by automated driving in which at least a part of vehicle travel is not performed by a driver, performing a recognition process for the front view of the vehicle on a basis of image information that is photographed, and performing travel control of the automated driving on a basis of a recognition result, wherein if a mirror surface is recognized ahead of the vehicle, a mirror surface recognized process is performed as the recognition process or mirror surface recognized control is performed as the travel control.

By the above configuration, in the case where the mirror surface is recognized ahead of the vehicle, if the mirror surface recognized control is performed as the recognition process, the recognition process regarding the automated driving can be performed appropriately. In addition, by the above configuration, in the case where the mirror surface is recognized ahead of the vehicle, if the mirror surface recognized control is performed as the travel control, the travel control regarding the automated driving can be performed appropriately.

BRIEF DESCRIPTION OF DRAWINGS

FIG. 2 is a flowchart of a travel control process that is performed in the first embodiment;

FIG. 7 is a flowchart of a second recognition process that is performed in the third embodiment.

DESCRIPTION OF EMBODIMENTS

Preferred embodiments of vehicle control device and method according to the present invention are hereinafter described in detail with reference to the attached drawings.

1. Configuration of Vehicle 10 and Vehicle Control Device 26

Figure 1:
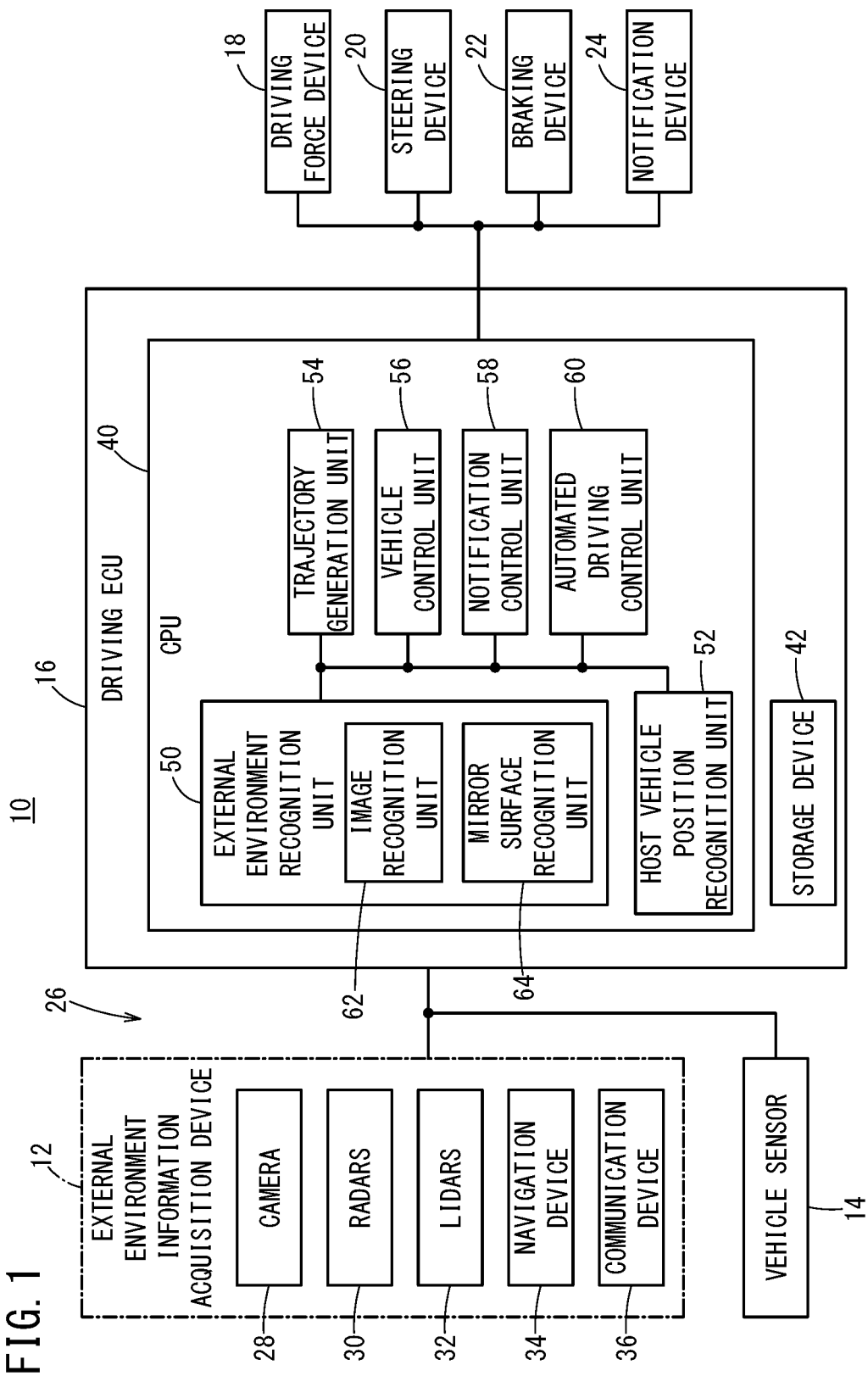
FIG. 1 is a configuration diagram of a vehicle that includes a vehicle control device according to first to third embodiments.

A configuration of an automated driving vehicle 10 (hereinafter, also referred to as a "vehicle 10") and a vehicle control device 26 is described with reference to FIG. 1. In the present specification, automated driving refers to a concept that includes not just "fully automated driving" in which travel control of the vehicle 10 is fully automated but also "partially automated driving" or "driving assistance" in which the travel control of the vehicle 10 is partially automated. The vehicle control device 26 is provided to the vehicle 10 and includes a camera 28 and a driving ECU 16. The vehicle 10 includes, as a configuration to perform the automated driving, an external environment information acquisition device 12, a vehicle sensor 14, the driving ECU 16, a driving force device 18, a steering device 20, a braking device 22, and a notification device 24.

The external environment information acquisition device 12 includes one or a plurality of cameras 28, a plurality of radars 30, a plurality of LIDARs 32, a navigation device 34, and a communication device 36. The camera 28 photographs a front view of the vehicle 10. The radars 30 irradiate a periphery of the vehicle 10 with electromagnetic waves and detect reflected waves resulting from the irradiation of the electromagnetic waves. The LIDARs 32 irradiate the periphery of the vehicle 10 with a laser and detect scattered light resulting from the irradiation of the laser. Note that a fusion sensor that combines image information photographed by the camera 28 and detection information acquired by the radars 30 can be used.

The navigation device 34 refers to map information and measures the current position of the vehicle 10 by using detection information from a satellite positioning device, the vehicle sensor 14, or the like so as to generate a travel route from the current position to a destination that is designated by a user. The navigation device 34 includes, as a user interface, an operation switch (including a touch panel), a display, and a speaker, and displays the generated travel route and guides the travel route with a sound.

The communication device 36 can receive information that is transmitted from a broadcasting station, and moreover can communicate with a different communication device that is provided to a road side machine, another vehicle, a server, or the like. The communication device 36 transmits and receives information about a traffic signal or the like, information about the other vehicle, traffic information, weather information, updated map information, or the like.

The vehicle sensor 14 includes a plurality of sensors that detects various kinds of behavior of the vehicle. For example, the vehicle sensor 14 includes a speed (vehicle speed) sensor that detects the speed (vehicle speed) of the vehicle 10, an acceleration sensor that detects acceleration or deceleration, a lateral acceleration sensor that detects lateral acceleration, a yaw rate sensor that detects angular velocity around a vertical axis of the vehicle 10, an azimuth sensor that detects a direction of the vehicle 10, an inclination sensor that detects inclination of the vehicle 10, or the like. In addition, the vehicle sensor 14 includes an operation detection sensor that detects whether each operation device (an accelerator pedal, a steering wheel, a brake pedal, a shift lever, a direction indicating lever, or the like) is operated, the operation amount, or an operation position. For example, the vehicle sensor 14 includes an accelerator pedal sensor that detects the accelerator stepping (opening) amount, a steering angle sensor that detects the operation amount of the steering wheel (steering angle), a torque sensor that detects steering torque, a brake pedal sensor that detects the brake stepping amount, a shift sensor that detects a shift position, or the like.

The driving ECU 16 is configured by one or a plurality of ECUs, and includes a CPU 40, a storage device 42, and the like. In the present embodiments, function achievement units 50, 52, 54, 56, 58, 60 to be described below are achieved when the CPU 40 executes programs stored in the storage device 42. Note that the function achievement units 50, 52, 54, 56, 58, 60 can be achieved by hardware including an integrated circuit and the like.

An external environment recognition unit 50 recognizes an object (the traffic participant, the obstacle, the road structure, the lane mark, the stop line, the traffic signal, the sign, or the like) ahead of the vehicle 10 on the basis of various pieces of information acquired by the external environment information acquisition device 12. In the present embodiment, the external environment recognition unit 50 includes an image recognition unit 62 and a mirror surface recognition unit 64 that use the image information photographed by the camera 28.

The image recognition unit 62 performs an image recognition process by using the image information photographed by the camera 28 so as to recognize the object ahead of the vehicle 10. For example, by performing pattern matching, the image recognition unit 62 recognizes the presence or absence and the position of the traffic participant, the obstacle, the road structure, the traffic signal, the sign, or the like. Moreover, by performing texture extraction or edge extraction such as Hough transformation, the image recognition unit 62 recognizes the presence or absence and the position of the lane mark, the stop line, or the like.

The mirror surface recognition unit 64 detects an optical flow and a vanishing point in the image. Then, the mirror surface recognition unit 64 recognizes the presence or absence of a mirror surface ahead of the vehicle 10 on the basis of the number of vanishing points or the state of the optical flow. That is to say, in the travel control of the automated driving, the mirror surface recognition unit 64 recognizes that a state where a mirror surface 90 does not exist ahead of the vehicle 10 has been changed to a state where the mirror surface 90 exists.

A host vehicle position recognition unit 52 recognizes the current position and the posture of the vehicle 10 on the basis of positional information of the vehicle 10 that is measured by the navigation device 34. Alternatively, the current position and the posture of the vehicle 10 can be recognized by measuring the current position of the vehicle 10 with the use of detection information from the satellite positioning device, the vehicle sensor 14, or the like instead of the navigation device 34.

A trajectory generation unit 54 generates a target travel trajectory and target speed of the vehicle 10 on the basis of a recognition result from the external environment recognition unit 50 and a recognition result from the host vehicle position recognition unit 52 in order to cause the vehicle 10 to travel along the travel route that is generated by the navigation device 34.

A vehicle control unit 56 outputs a control instruction to the driving force device 18, the steering device 20, and the braking device 22. In the automated driving, the vehicle control unit 56 outputs the control instruction so as to cause the vehicle 10 to travel at the target speed along the target travel trajectory that is generated by the trajectory generation unit 54. In manual driving, the vehicle control unit 56 outputs the control instruction on the basis of a detection result from the vehicle sensor 14 (operation detection sensor).

If notification to a driver is necessary, for example, if the automated driving is stopped, a notification control unit 58 outputs a notification instruction to the notification device 24.

An automated driving control unit 60 integrally controls the automated driving. The automated driving control unit 60 starts or stops the automated driving in accordance with a driver's operation of an automated driving switch. In addition, the automated driving control unit 60 stops the automated driving when the vehicle sensor 14 has detected a manual operation of any one of the operation devices in the automated driving.

The driving force device 18 includes a driving force ECU and a driving source of the vehicle 10 such as an engine and/or a traction motor. The driving force device 18 generates travel driving force (torque) for the travel of the vehicle 10 in accordance with the control instruction that is output from the vehicle control unit 56, and transmits the travel driving force to the wheels directly or through a transmission.

The steering device 20 includes an EPS (electric power steering system) ECU and an EPS device. The steering device 20 changes the direction of the wheels (steering wheels) in accordance with the control instruction that is output from the vehicle control unit 56.

For example, the braking device 22 is an electric servo brake that is used in combination with a hydraulic brake, and includes a brake ECU and a brake actuator. The braking device 22 brakes the wheels in accordance with the control instruction that is output from the vehicle control unit 56.

The notification device 24 includes a notification ECU, and a display device and/or an audio device. The notification device 24 notifies a request of the manual driving, warning, a guide, or the like in accordance with the notification instruction that is output from the notification control unit 58.

2. First Embodiment

Figure 3A:
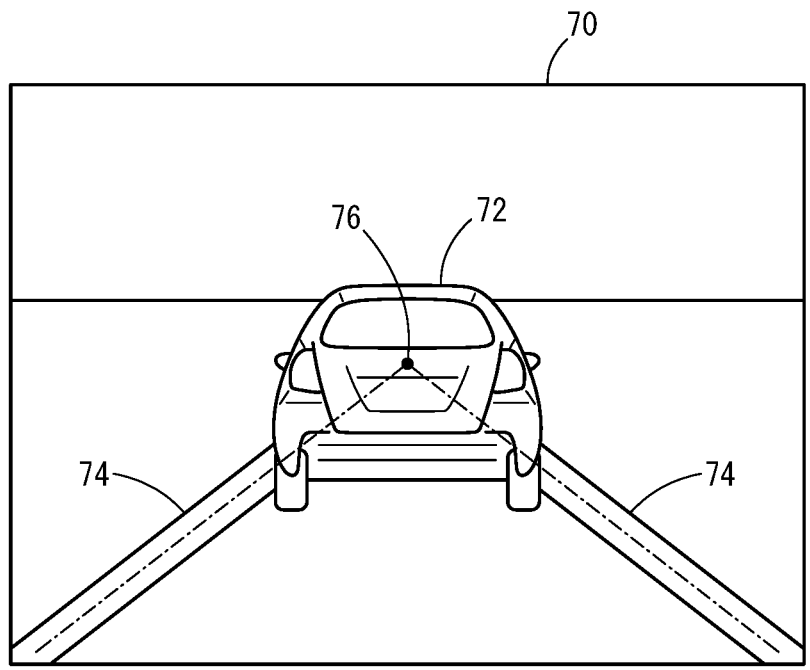
FIG. 3A is a diagram that illustrates an image in which a normal vehicle is photographed by a camera.
Figure 3B:
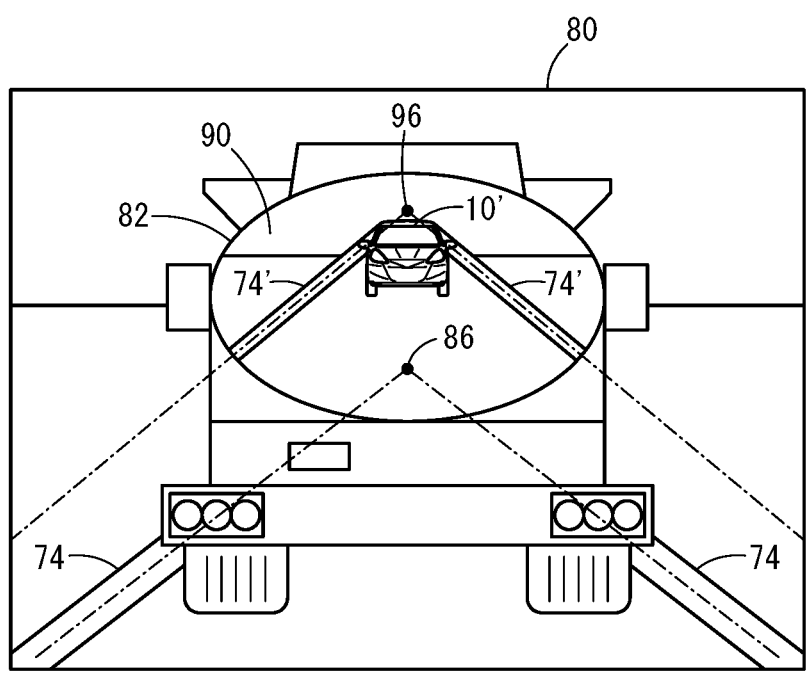
FIG. 3B is a diagram that illustrates an image in which a tank lorry is photographed by the camera.

A series of processes performed in a first embodiment is described with reference to FIG. 2, FIG. 3A, and FIG. 3B. In the first embodiment, if the mirror surface recognition unit 64 recognizes the mirror surface 90 ahead of the vehicle 10, the automated driving control unit 60 stops the travel control of the automated driving. It is the driving ECU 16 that mainly performs the process in FIG. 2. The driving ECU 16 repeatedly executes the process in FIG. 2 at predetermined time intervals while the vehicle 10 operates.

In step S1, it is determined whether the automated driving is being performed. If the travel control by the automated driving is being performed (step S1: YES), the process advances to step S2. On the other hand, if the travel control by the automated driving is not being performed (step S1: NO), the process of and after step S2 is not performed and the process is terminated once.

In step S2, the driving ECU 16 acquires the latest image information that is photographed by the camera 28. In step S3, the mirror surface recognition unit 64 recognizes the presence or absence of the mirror surface 90. A specific mirror surface recognition method will be described in a paragraph [3] below. If the existence of the mirror surface 90 is recognized (step S3: YES), the process advances to step S4. On the other hand, if the existence of the mirror surface 90 is not recognized (step S3: NO), the process advances to step S5.

When the process has advanced from step S3 to step S4, the automated driving control unit 60 performs mirror surface recognized control. Here, the automated driving control unit 60 stops the automated driving. The automated driving is stopped in the following procedure. First, the notification control unit 58 outputs to the notification device 24 the notification instruction to facilitate the manual driving. If the driver operates the automated driving switch or each operation device, for example, the accelerator pedal, the operation detection sensor of the vehicle sensor 14 outputs a detection signal. If the driving ECU 16 receives the detection signal that is output from the vehicle sensor 14, the automated driving control unit 60 stops the automated driving. On the other hand, if the driver does not operate the automated driving switch or each operation device, the automated driving control unit 60 causes the vehicle control unit 56 to perform stop control a predetermined time after the mirror surface recognition unit 64 recognizes the mirror surface 90. The vehicle control unit 56 outputs the control instruction to the braking device 22 so as to stop the vehicle 10. After the vehicle 10 is stopped, the automated driving control unit 60 stops the automated driving.

When the process has advanced from step S3 to step S5, the automated driving control unit 60 performs normal control. Here, the automated driving control unit 60 continues the automated driving.

3. Method for Recognizing the Mirror Surface 90

A first method of the mirror surface recognition method performed in step S3 in FIG. 2 is described with reference to FIG. 3A and FIG. 3B. As illustrated in FIG. 3A, if the mirror surface 90 does not exist ahead of the vehicle 10, for example, if a normal vehicle 72 (in the present specification, a vehicle that does not include the mirror surface 90) exists, one vanishing point 76 exists in an image 70. In FIG. 3A, the vanishing point 76 exists approximately on extension lines of left and right lane marks 74, 74. On the other hand, as illustrated in FIG. 3B, if the mirror surface 90 exists ahead of the vehicle 10, for example, if a tank lorry (a tanker) 82 with the mirror surface 90 on its rear surface exists, a first vanishing point 86 and a second vanishing point 96 exist in an image 80. In FIG. 3B, the first vanishing point 86 exists approximately on the extension lines of the left and right lane marks 74, 74. On the other hand, the second vanishing point 96 exists inside the mirror surface 90 and approximately on extension lines of images 74', 74' of the left and right lane marks 74, 74. As described above, the number of the vanishing points is different depending on the presence or absence of the mirror surface 90. If a single vanishing point (vanishing point 76) is recognized, a state where the mirror surface 90 does not exist ahead of the vehicle 10 is recognized, and if a plurality of vanishing points (the first vanishing point 86, the second vanishing point 96) is recognized, a state where the mirror surface 90 exists ahead of the vehicle 10 is recognized.

Figure 4:
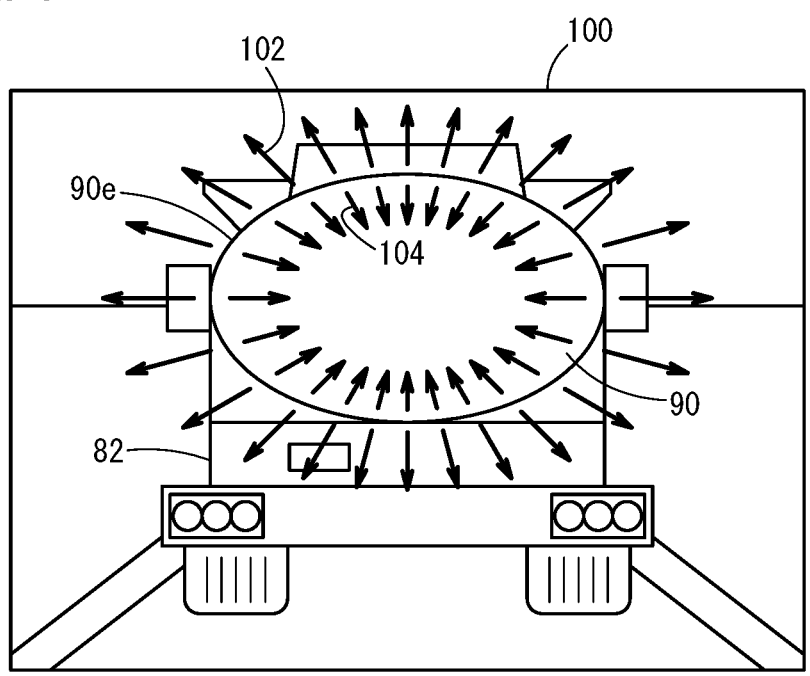
FIG. 4 is a diagram that partially illustrates optical flows in the image in which the tank lorry is photographed.

A second method that is different from the first method is described with reference to FIG. 4. As illustrated in FIG. 4, if the mirror surface 90 exists ahead of the vehicle 10, optical flows 102 around the mirror surface 90 and optical flows 104 inside the mirror surface 90 become opposite to each other starting from an edge part 90e of the mirror surface 90 corresponding to a border. The optical flows 104 converge on the inside of the mirror surface 90 (a part of area in the image 100), and the optical flows 102 diverge to the outside of the mirror surface 90. As described above, if the mirror surface 90 exists ahead of the vehicle 10, peculiar optical flows, that is, the optical flows 104 that converge on the inside of the part of the area in the image 100 and the optical flows 102 that diverge to the outside of the part of the area occur. If a pattern of the optical flows 102, 104 is not recognized, the state where the mirror surface 90 does not exist ahead of the vehicle 10 is recognized, and if the pattern of the optical flows 102, 104 is recognized, the state where the mirror surface 90 exists ahead of the vehicle 10 is recognized.

4. Second Embodiment

A series of processes performed in a second embodiment is described with reference to FIG. 5 and FIG. 6. In the second embodiment, if the mirror surface recognition unit 64 recognizes the mirror surface 90 ahead of the vehicle 10, the image recognition unit 62 regards the object outside an exclusion area 112 including the mirror surface 90 ahead of the vehicle 10 as a recognition target, and ignores the object inside an exclusion area 112. It is the driving ECU 16 that mainly performs the process in FIG. 5. The driving ECU 16 repeatedly executes the process in FIG. 5 at predetermined time intervals while the vehicle 10 operates.

Figure 5:
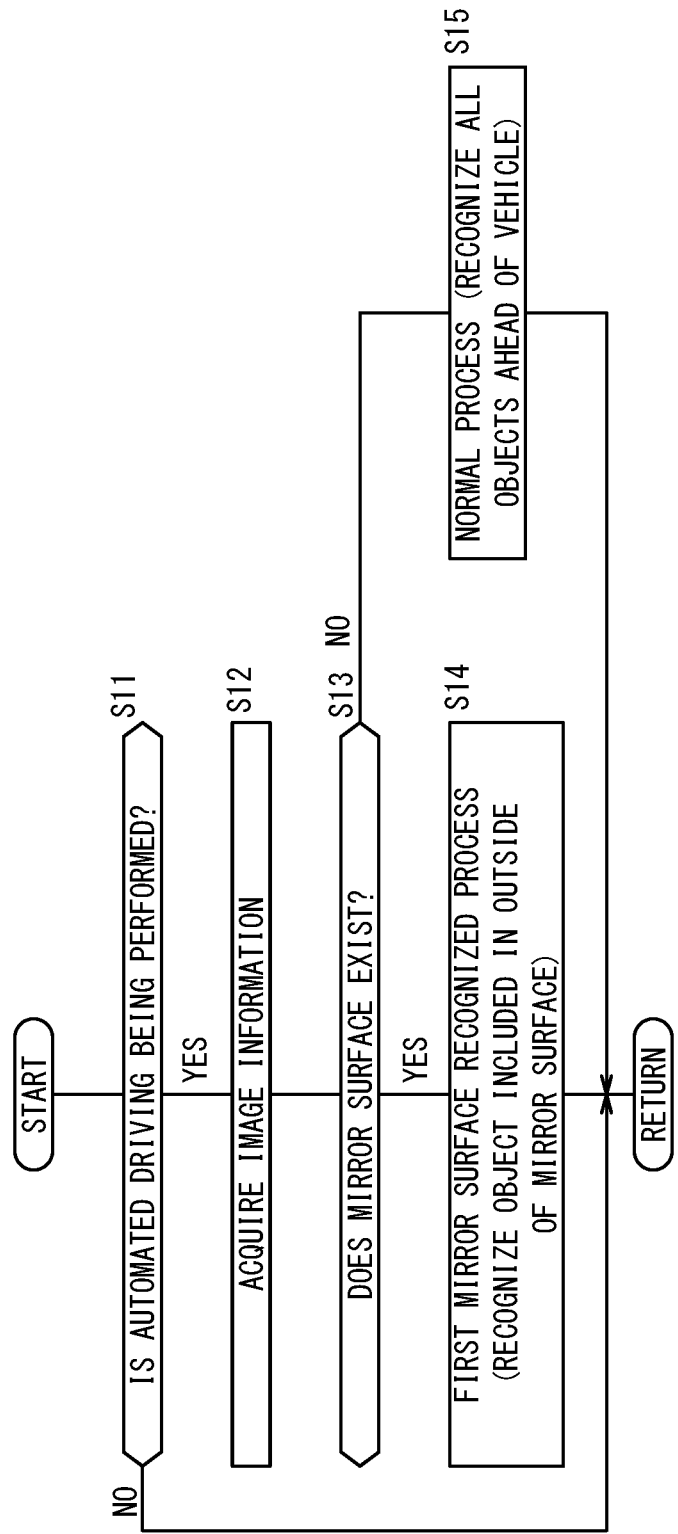
FIG. 5 is a flowchart of a first recognition process that is performed in the second embodiment.
Figure 6:
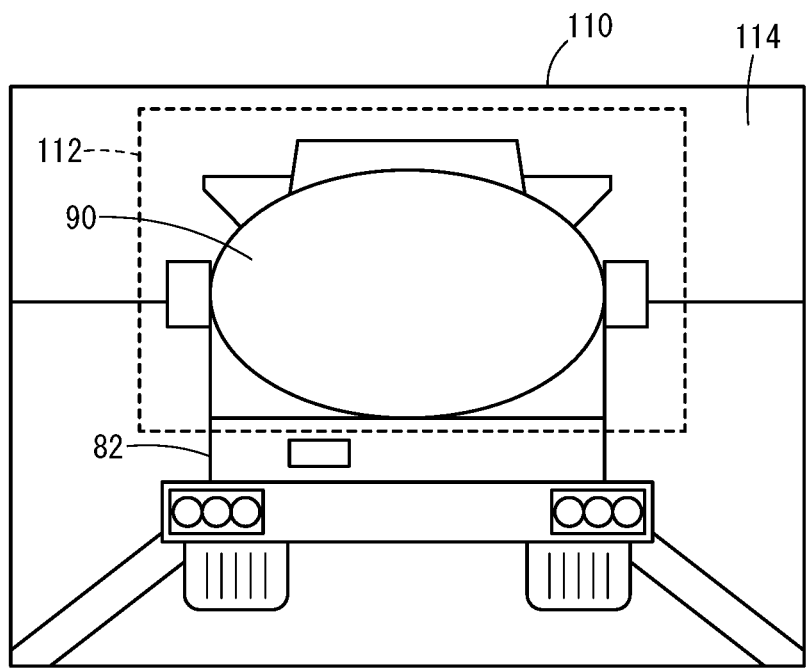
FIG. 6 is a diagram that illustrates, in an image of a front view of the vehicle, an area that is recognized and an area that is ignored.

The process in step S11 to step S13 in FIG. 5 is the same as the process in step S1 to step S3 in FIG. 2. Thus, the description of step S11 to step S13 is omitted.

When the process has advanced from step S13 to step S14, the image recognition unit 62 performs a first mirror surface recognized control. Here, among the objects ahead of the vehicle 10 photographed by the camera 28, the object included in the mirror surface 90 (object reflected in the mirror surface 90) is excluded from the recognition target, and the object included in the outside of the mirror surface 90 is regarded as the recognition target.

For example, if the mirror surface recognition unit 64 recognizes the mirror surface 90, the image recognition unit 62 specifies the exclusion area 112 including the mirror surface 90. Then, the recognition process for the object included in a recognition area 114 corresponding to an image 110 without the exclusion area 112 is performed. Alternatively, after the recognition process for the objects included in the image 110 is performed, the object included in the exclusion area 112 is excluded from the recognition target. As a result of the above process, when the trajectory generation unit 54 generates the target travel trajectory and the target speed of the vehicle 10, a recognition result about the object included in the recognition area 114 is used, but the object included in the exclusion area 112 is ignored.

When the process has advanced from step S13 to step S15, the image recognition unit 62 performs a normal process. Here, all the objects ahead of the vehicle 10 photographed by the camera 28 are regarded as the recognition target.

5. Third Embodiment

A series of the processes performed in a third embodiment is described with reference to FIG. 7 and FIG. 3B. In the third embodiment, if the mirror surface recognition unit 64 recognizes the mirror surface 90 ahead of the vehicle 10, the image recognition unit 62 regards the object outside the mirror surface 90 and a specific object inside the mirror surface 90 ahead of the vehicle 10 as the recognition target. It is the driving ECU 16 that mainly performs the process in FIG. 7. The driving ECU 16 repeatedly executes the process in FIG. 7 at predetermined time intervals while the vehicle 10 operates.

The process in step S21 to step S23 in FIG. 7 is the same as the process in step S1 to step S3 in FIG. 2. Thus, the description of step S21 to step S23 is omitted.

When the process has advanced from step S23 to step S24, the image recognition unit 62 performs a second mirror surface recognized control. Here, among the objects ahead of the vehicle 10 photographed by the camera 28, the specific object included in the mirror surface 90 (specific object reflected in the mirror surface 90) and the object included in the outside of the mirror surface 90 are regarded as the recognition target. The specific object can be set arbitrarily. Here, an image 10' of the vehicle 10, the image 74' of the lane mark 74, and an image (not shown) of a vehicle that follows the vehicle 10 are set as the specific objects here.

For example, if the mirror surface recognition unit 64 recognizes the mirror surface 90, the image recognition unit 62 specifies the position of the mirror surface 90. Then, the recognition process for the object included in the area outside the mirror surface 90 is performed, and moreover, the recognition process for the specific object included in the area inside the mirror surface 90 is performed. Alternatively, after the recognition process for the objects included in the image 80 is performed, the object other than the specific object included in the mirror surface 90 is excluded from the recognition target.

When the trajectory generation unit 54 generates the target travel trajectory and the target speed of the vehicle 10, a recognition result about the object included in the outside of the mirror surface 90 and a recognition result about the specific object included in the mirror surface 90 are used. The trajectory generation unit 54 generates the target travel trajectory so that the vehicle 10 travels at an approximately center between the lane marks 74 on the basis of positional information of the images 74' of the lane marks 74 and positional information of the image 10' of the vehicle 10 as the recognition result about the specific object. The vehicle control unit 56 outputs the control instruction to the steering device 20 in order to cause the vehicle 10 to travel along the target travel trajectory.

When the process has advanced from step S23 to step S25, the image recognition unit 62 performs the normal process. Here, all the objects ahead of the vehicle 10 photographed by the camera 28 are regarded as the recognition target.

6. Another Form of Third Embodiment

If an inter-vehicle distance between the tank lorry 82 and the vehicle 10 is small, the lane mark 74 itself on a road surface may not be recognized. If the lane mark 74 cannot be recognized, the external environment recognition unit 50 may generate a virtual lane mark on the basis of the image 74' of the lane mark 74. For example, the virtual lane mark may be the extension line of the image 74', or the virtual lane mark may be generated at a position that is inside the extension line of the image 74' and is apart from the image 74' by a predetermined distance. If the virtual lane mark is generated, the trajectory generation unit 54 generates the target travel trajectory on the basis of the virtual lane mark.

7. Summary of Embodiments

The vehicle control device 26 according to the first to third embodiments includes: the camera 28 configured to photograph the front view of the vehicle 10; and the driving ECU 16 (control unit) configured to perform the recognition process for the front view of the vehicle 10 on the basis of the image information photographed by the camera 28, and perform the travel control of the automated driving on the basis of the recognition result. In the first embodiment, if the mirror surface 90 is not recognized ahead of the vehicle 10, the driving ECU 16 is configured to perform the normal control as the travel control, and if the mirror surface 90 is recognized ahead of the vehicle 10, the driving ECU 16 is configured to perform the mirror surface recognized control that is different from the normal control as the travel control. In the second and third embodiments, if the mirror surface 90 is not recognized ahead of the vehicle 10, the driving ECU 16 is configured to perform the normal process as the recognition process, and if the mirror surface 90 is recognized ahead of the vehicle 10, the driving ECU 16 is configured to perform the mirror surface recognized control that is different from the normal process as the recognition process.

In addition, in the vehicle control method according to the first to third embodiments, if the travel control of the automated driving is currently performed and it is recognized that the state where the mirror surface 90 does not exist ahead of the vehicle 10 has been changed to the state where the mirror surface 90 exists, the recognition process is changed from the normal process to the mirror surface recognized control or the travel control is changed from the normal control to the mirror surface recognized control.

As described in the first embodiment, in the case where the mirror surface 90 is recognized ahead of the vehicle 10, if the mirror surface recognized control is performed as the travel control, the travel control regarding the automated driving can be performed appropriately. In addition, as described in the second and third embodiments, in the case where the mirror surface 90 is recognized ahead of the vehicle 10, if the mirror surface recognized control is performed as the recognition process, the recognition process regarding the automated driving can be performed appropriately.

In the first to third embodiments, if one vanishing point (vanishing point 76) is recognized ahead of the vehicle 10 on the basis of the image information, the driving ECU 16 is configured to recognize the state where the mirror surface 90 does not exist ahead of the vehicle 10. On the other hand, if the plurality of vanishing points (the first vanishing point 86, the second vanishing point 96) is recognized ahead of the vehicle 10, the driving ECU 16 is configured to recognize the state where the mirror surface 90 exists ahead of the vehicle 10. In this configuration, by the simple method, it can be determined whether the mirror surface 90 exists ahead of the vehicle 10.

In the first embodiment, the driving ECU 16 is configured to perform the travel control of the automated driving as the normal control, and stop the travel control of the automated driving as the mirror surface recognized control. By this configuration, if the mirror surface 90 exists ahead of the vehicle 10, the driving can be taken over from the vehicle 10 to the driver.

In the second embodiment, the driving ECU 16 is configured to, as the normal process, regard the object ahead of the vehicle 10 as the recognition target, and, as the mirror surface recognized control, regard the object outside the mirror surface 90 ahead of the vehicle 10 as the recognition target. By this configuration, if the mirror surface 90 exists ahead of the vehicle 10, the object included in the mirror surface 90, that is, the external environment information behind the vehicle 10 can be ignored, and only the object outside the mirror surface 90, that is, only the external environment information ahead of the vehicle 10 can be regarded as the recognition target.

In the third embodiment, the driving ECU 16 is configured to, as the normal process, regard the object ahead of the vehicle 10 as the recognition target, and, as the mirror surface recognized control, regard the object outside the mirror surface 90 as the recognition target and the specific object included in the mirror surface 90 as the recognition target. By this configuration, if the mirror surface 90 exists ahead of the vehicle 10, the useful information of the object included in the mirror surface 90, that is, the external environment information behind the vehicle 10 can be used.

In the third embodiment, the driving ECU 16 is configured to regard the image 74' of the lane mark 74 included in the mirror surface 90 as the recognition target. By this configuration, if the mirror surface 90 exists ahead of the vehicle 10, the vehicle 10 can be controlled by using the image 74' of the lane mark 74 reflected in the mirror surface 90.

In the third embodiment, the driving ECU 16 is configured to regard the image 10' of the vehicle 10 and the images 74' of the lane marks 74 included in the mirror surface 90 as the recognition target, and perform the control of keeping the position of the vehicle 10 between the lane marks 74 on the basis of the recognition result about the images 74' of the lane marks 74 included in the mirror surface 90 and the recognition result about the image 10' of the vehicle 10 included in the mirror surface 90. By this configuration, even if the lane mark 74 ahead of the vehicle 10 cannot be recognized, the lane keeping control of the vehicle 10 can be performed by using the recognition result about the images 74' of the lane marks 74 and the image 10' of the vehicle 10 acquired from the mirror surface 90.

The invention claimed is:

1. A vehicle control device provided for a vehicle that is configured to travel by automated driving in which at least a part of vehicle travel is not performed by a driver, the vehicle control device comprising:
   a camera configured to photograph a front view of the vehicle; and
   a processor that functions as a control unit configured to perform a recognition process for the front view of the vehicle on a basis of image information photographed by the camera, and perform travel control of the automated driving on a basis of a recognition result,
   wherein if another vehicle including a mirror surface on its rear surface is not recognized ahead of the vehicle, the control unit is configured to perform a normal process as the recognition process or perform normal control as the travel control, and
   if another vehicle including the mirror surface on its rear surface is recognized ahead of the vehicle, the control unit is configured to perform a mirror surface recognized process that is different from the normal process as the recognition process, or perform mirror surface recognized control that is different from the normal control as the travel control.

2. A vehicle control device provided for a vehicle that is configured to travel by automated driving in which at least a part of vehicle travel is not performed by a driver, the vehicle control device comprising:
   a camera configured to photograph a front view of the vehicle; and
   a processor that functions as a control unit configured to perform a recognition process for the front view of the vehicle on a basis of image information photographed by the camera, and perform travel control of the automated driving on a basis of a recognition result,
   wherein if one vanishing point is recognized ahead of the vehicle on a basis of the image information, the control unit is configured to recognize a state where a mirror surface does not exist ahead of the vehicle, and to perform a normal process as the recognition process or perform normal control as the travel control, and
   if a plurality of vanishing points are recognized ahead of the vehicle, the control unit is configured to recognize a state where the mirror surface exists ahead of the vehicle, and to perform a mirror surface recognized process that is different from the normal process as the recognition process, or perform mirror surface recognized control that is different from the normal control as the travel control.

3. The vehicle control device according to claim 1, wherein the control unit is configured to perform the travel control of the automated driving as the normal control, and stop the travel control of the automated driving as the mirror surface recognized control.

4. The vehicle control device according to claim 1, wherein the control unit is configured to, as the normal process, regard an object ahead of the vehicle as a recognition target, and, as the mirror surface recognized process, regard an object outside the mirror surface ahead of the vehicle as the recognition target.

5. The vehicle control device according to claim 1, wherein the control unit is configured to, as the normal process, regard an object ahead of the vehicle as a recognition target, and, as the mirror surface recognized process, regard an object outside the mirror surface as the recognition target and a specific object included in the mirror surface as the recognition target.

6. The vehicle control device according to claim 5, wherein the control unit is configured to regard an image of a lane mark included in the mirror surface as the recognition target.

7. A vehicle control device provided for a vehicle that is configured to travel by automated driving in which at least a part of vehicle travel is not performed by a driver, the vehicle control device comprising:
   a camera configured to photograph a front view of the vehicle; and
   a processor that functions as a control unit configured to perform a recognition process for the front view of the vehicle on a basis of image information photographed by the camera, and perform travel control of the automated driving on a basis of a recognition result,
   wherein if a mirror surface is not recognized ahead of the vehicle, the control unit is configured to perform a normal process as the recognition process or perform normal control as the travel control, and
   if the mirror surface is recognized ahead of the vehicle, the control unit is configured to perform a mirror surface recognized process that is different from the normal process as the recognition process, or perform mirror surface recognized control that is different from the normal control as the travel control,
   wherein the control unit is configured to, as the normal process, regard an object ahead of the vehicle as a recognition target, and, as the mirror surface recognized process, regard an object outside the mirror surface as the recognition target and a specific object included in the mirror surface as the recognition target, and
   wherein the control unit is configured to regard an image of the vehicle and images of lane marks included in the mirror surface as the recognition target, and perform control of keeping a position of the vehicle between the lane marks on a basis of a recognition result about the images of the lane marks included in the mirror surface and a recognition result about the image of the vehicle included in the mirror surface.

\* \* \* \* \*